United States Patent
Leah et al.

(10) Patent No.: US 10,283,792 B2
(45) Date of Patent: May 7, 2019

(54) METHOD AND APPARATUS FOR OPERATING A SOLID-OXIDE FUEL CELL STACK WITH A MIXED IONIC/ELECTRONIC CONDUCTING ELECTROLYTE

(71) Applicant: CERES INTELLECTUAL PROPERTY COMPANY LIMITED, Sussex (GB)

(72) Inventors: Robert Leah, Croydon (GB); Nigel Peter Brandon, Sutton (GB); Athol Duckett, East Molesey (GB); Karim El Koury, London (GB); Martin Schmidt, Wallington (GB)

(73) Assignee: CERES INTELLECTUAL PROPERTY COMPANY LIMITED, Horsham (GB)

( * ) Notice: Subject to any disclaimer, the term of this patent is extended or adjusted under 35 U.S.C. 154(b) by 113 days.

(21) Appl. No.: 15/640,333

(22) Filed: Jun. 30, 2017

(65) Prior Publication Data
US 2017/0301936 A1    Oct. 19, 2017

Related U.S. Application Data

(60) Division of application No. 13/898,417, filed on May 20, 2013, now abandoned, which is a continuation of
(Continued)

(30) Foreign Application Priority Data

Feb. 10, 2004    (GB) .................................. 0402906.2

(51) Int. Cl.
| | | |
|---|---|---|
| *H01M 8/124* | (2016.01) | |
| *H01M 8/126* | (2016.01) | |
| *H01M 8/0432* | (2016.01) | |
| *H01M 8/0438* | (2016.01) | |
| *H01M 8/04014* | (2016.01) | |
| *H01M 8/04089* | (2016.01) | |

(Continued)

(52) U.S. Cl.
CPC ... *H01M 8/04925* (2013.01); *H01M 8/04014* (2013.01); *H01M 8/04097* (2013.01);
(Continued)

(58) Field of Classification Search
None
See application file for complete search history.

(56) References Cited

U.S. PATENT DOCUMENTS

| | | |
|---|---|---|
| 5,346,778 A | 9/1994 | Ewan et al. |
| 5,366,821 A | 11/1994 | Merritt et al. |

(Continued)

FOREIGN PATENT DOCUMENTS

| | | |
|---|---|---|
| EP | 1 324 456 A1 | 7/2003 |
| GB | 2 405 028 A | 2/2005 |

(Continued)

OTHER PUBLICATIONS

Sahibzada M et al. "Operation of Solid Oxide Fuel Cells at Reduced Temperatures", Fuel, IPC Science and Technology Press, Guildford, GB, vol. 78, No. 6, May 1999, pp. 639-643.

*Primary Examiner* — Krishnan S Menon
(74) *Attorney, Agent, or Firm* — Shapiro, Gabor and Rosenberger, PLLC (57) ABSTRACT

A method and apparatus for operating an intermediate-temperature solid-oxide fuel cell stack (10) with a mixed ionic/electronic conducting electrolyte in order to increase its efficiency. The required power output of the solid-oxide fuel cell stack (10) is determined and one or more operating conditions of the solid fuel cell stack (10) are controlled dependent upon the determined required power output. The operating conditions that are controlled may be at least one or the temperature of the fuel cell stack and the dilution of fuel delivered to the fuel cell stack.

2 Claims, 11 Drawing Sheets

LHV energy conversion efficiency as a function of electrical power density for a range of given operating temperatures

Related U.S. Application Data application No. 10/588,897, filed as application No. PCT/GB2005/000355 on Feb. 2, 2005, now abandoned.

(51) Int. Cl.
*H01M 8/04537* (2016.01)
*H01M 8/04701* (2016.01)
*H01M 8/04858* (2016.01)

(52) U.S. Cl.
CPC ... *H01M 8/04365* (2013.01); *H01M 8/04395* (2013.01); *H01M 8/04417* (2013.01); *H01M 8/04559* (2013.01); *H01M 8/04619* (2013.01); *H01M 8/04731* (2013.01); *H01M 8/126* (2013.01); *H01M 2008/1293* (2013.01); *Y02E 60/525* (2013.01); *Y02P 70/56* (2015.11)

(56) References Cited

U.S. PATENT DOCUMENTS

| | | | |
|---|---|---|---|
| 6,139,985 A | 10/2000 | Borglum et al. | |
| 6,586,127 B1 * | 7/2003 | Ishihara | B01D 53/326 |
| | | | 252/519.1 |
| 6,977,118 B1 | 12/2005 | Von Adrian | |
| 2001/0036566 A1 | 11/2001 | Dekker et al. | |
| 2002/0127456 A1 | 9/2002 | Pham et al. | |
| 2003/0012996 A1 | 1/2003 | Bitterlich et al. | |

FOREIGN PATENT DOCUMENTS

| | | |
|---|---|---|
| JP | 58-112262 A | 7/1983 |
| JP | 60-79675 A | 5/1985 |
| JP | 10-284108 A | 10/1998 |
| JP | 2002-518793 A | 6/2002 |
| JP | 2002-352834 A | 12/2002 |
| JP | 2003-59495 A | 2/2003 |
| JP | 2003-086211 A | 3/2003 |
| JP | 2003-115315 A | 4/2003 |
| JP | 2003-323909 A | 11/2003 |
| JP | 2003-331885 A | 11/2003 |
| JP | 2003-346864 A | 12/2003 |
| WO | WO 97/41612 A1 | 11/1997 |
| WO | WO 01/33654 A1 | 5/2001 |
| WO | WO 03/098728 A1 | 11/2003 |
| WO | WO 03/107463 A2 | 12/2003 |

* cited by examiner

Figure 1 – LHV energy conversion efficiency as a function of electrical power density for a range of given operating temperatures Figure 2 – LHV energy conversion efficiency as a function of electrical power density for a range of hydrogen % in steam

Figure 3

Figure 4 – SOFC system operating on LPG showing method of implementation described in Method 1

Fig. 5 - Stack and system power outputs

Fig. 6 - Stack temperature

Fig. 7 - Stoichiometric air ratio

Fig. 8 - Stack and system efficiency

Fig. 9 - Ionic and external stack currents

Fig. 10 - Cell voltage

Fig. 11 - Steam/Carbon ratio

Fig. 12 - Stack efficiency

METHOD AND APPARATUS FOR OPERATING A SOLID-OXIDE FUEL CELL STACK WITH A MIXED IONIC/ELECTRONIC CONDUCTING ELECTROLYTE

The present invention relates to a method and apparatus for operating a solid oxide fuel cell stack in order to increase its efficiency, in particular by varying one or more operating conditions of the fuel cell.

Solid oxide fuel cells (SOFCs) are a promising means of generating electricity from either hydrogen or fossil fuels in a more efficient and environmentally acceptable manner than more traditional generating technologies. However traditional SOFCs operate at very high temperatures (greater than 900° C.), and even more recent innovations have only been able to reduce this temperature to 700-800° C. This high temperature of operation leads to significant problems with the materials used in the construction of such fuel cell stacks and the related system components. Materials which can withstand prolonged operation at these temperatures tend to either be expensive, fragile or both. Attempting to use lower cost materials, such as ferritic stainless steels, at high operating temperatures causes problems with stack performance degradation due to oxidation of the metal and migration of volatile chromium species over prolonged periods at these high operating temperatures.

In order to make a commercially attractive SOFC stack for mass-market applications, there is therefore a strong incentive to try and reduce the operating temperature of the stack and hence the cost of the materials required. At a temperature of below 650° C., low-cost materials of construction such as ferritic stainless steels are sufficiently stable as to allow long-term operation without significant stack performance degradation.

Conventional SOFCs use an yttrium-doped zirconium oxide (YSZ) electrolyte. This is a material which conducts oxide ions at high temperatures, but not electrons. It is therefore well suited for use as a fuel cell electrolyte. Unfortunately YSZ is not a particularly good oxide ion conductor, and its ionic resistance becomes impractically high below about 650° C., leading to very poor fuel cell performance. In order to operate below this temperature, which as stated previously is highly desirable, a different electrolyte material is required.

Unlike, YSZ which does not conduct electrons, there are a number of mixed ionic/electronic conducting ceramic electrolyte materials which have a high ionic conductivity below 650° C. In terms of its performance, stability and safety in handling, the most promising and widely used of these low-temperature mixed ionic/electronic conducting electrolyte materials is gadolinium-doped cerium oxide (CGO), although there are other materials such as other doped ceria oxides. CGO exhibits good ionic conductivity down to below 500° C. Unfortunately CGO is not as stable as YSZ, and in a reducing atmosphere at temperature (such as that normally found on the anode side of the fuel cell), $Ce^{4+}$ ions can be reduced to $Ce^{3+}$. This results in the electrolyte developing some electronic conductivity, resulting in a short-circuit current flowing within the fuel cell. This short-circuit is observed externally as a drop in the cell terminal voltage at open-circuit, and results in a loss of efficiency in converting the energy in the fuel to electricity.

This feature of CGO has led many people to reject it as an electrolyte material, as they consider the efficiency loss through the internal short circuit is too severe for a practical device.

It is an object of the present invention to reduce at least some of the problems discussed above.

According to a first aspect of the present invention there is provided a method of operating a solid oxide fuel cell stack with a mixed ionic/electronic conducting electrolyte, the method comprising determining the required power output of the solid oxide fuel cell stack and controlling one or more operating conditions of the solid oxide fuel cell stack dependent upon the determined power output.

The operating conditions of the solid oxide fuel cell stack that are varied are preferably at least one of the temperature of the fuel cell stack and the dilution of fuel delivered to the fuel cell stack.

The electronic conductivity of CGO is strongly temperature dependent, and at a sufficiently low temperature the electronic leakage current can be reduced to an acceptable level. As the operating temperature of the CGO electrolyte material reduces, so does the magnitude of the short-circuit effect. The effect reduces to such a degree that when the operating temperature reduces to 500° C. the effect is negligible. Therefore CGO is a suitable electrolyte material when the fuel cell operating temperature is below a temperature of 650° C. or more preferably 600° C. This is particularly the case under a high external load, where the flux of oxide ions through the electrolyte tends to reoxidise the $Ce^{3+}$ ions to $Ce^{4+}$, thus eliminating the electronic conductivity.

The efficiency of a fuel cell stack with an electrolyte including cerium rises rapidly at above about 50% of its rated power, as the short-circuit current becomes small relative to the external circuit current.

It can be demonstrated, for example that at near full power operation and at a temperature of less than 600° C., the efficiency of a CGO-based fuel cell is comparable with a YSZ-based fuel cell operating at temperatures in excess of 700° C. and there is no significant penalty resulting from the use of CGO.

According to a second aspect of the present invention there is provided a control system for a solid-oxide fuel cell stack with a mixed ionic/electronic conducting electrolyte, the control system comprising means for determining a required power output of the stack and a controller for controlling one or more operating conditions of the stack dependent upon the required power output.

The controller may be arranged to control at least one of the temperature of the stack and the dilution of fuel delivered to the stack.

A fuel cell stack with a mixed ionic/electronic conducting electrolyte may be provided with a control system according to the second aspect of the present invention.

Embodiments of the present invention will now be described by way of example with reference to the accompanying drawings, in which.

Two strategies are presented below for the minimisation of the short-circuit current under part-load conditions, thus maximising the efficiency of the fuel cell across its full operating range.

Method 1

Figure 1:
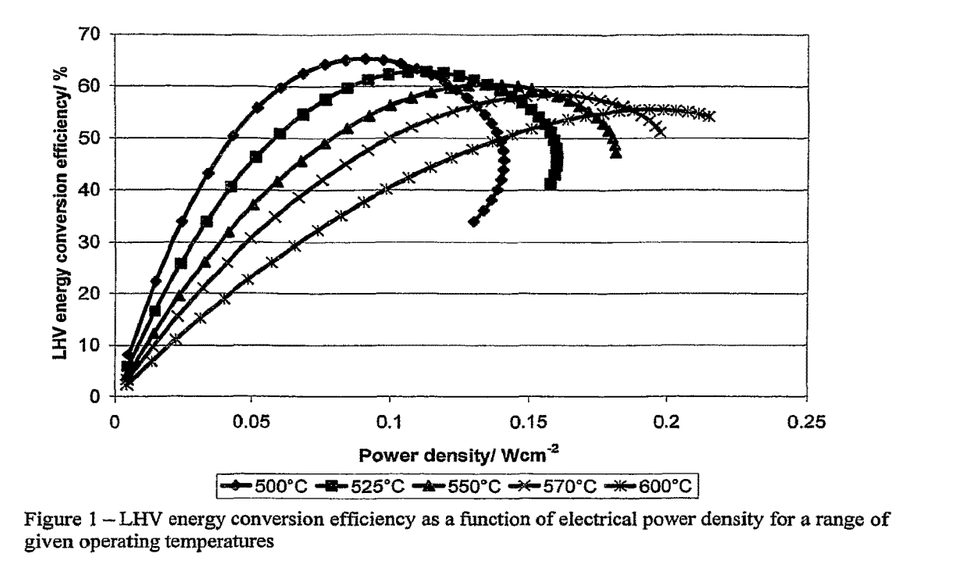
FIG. 1 shows the energy conversion efficiency of a fuel cell with a CGO-based electrolyte plotted against electrical power density at a range of temperatures from 500° C. to 600° C.

FIG. 1 illustrates the results of a computer simulation of a CGO-based fuel cell with a nominal maximum specific power output of 0.2 $Wcm^{-2}$. Energy conversion efficiency is plotted against electrical power density at a range of operating temperatures from 500° C. to 600° C. The energy conversion efficiency is defined as the electrical power output divided by the chemical energy in the hydrogen fuel consumed, assuming 100% fuel conversion. These values are therefore the maximum theoretical efficiencies for this cell, and not the actual efficiencies, since in reality 100% fuel conversion is not possible. However, the real trend would follow the same pattern.

It can be seen from FIG. 1 that the maximum efficiency at any given power density is temperature dependent, and that the higher the power density, the higher the temperature at which maximum efficiency occurs. The reason for this is as follows. A lower temperature of operation reduces both the absolute magnitude of the electronic leakage current density, and the external circuit current density at which the electronic leakage current becomes negligible. This means that at low external current densities, a higher efficiency can be achieved at a low operating temperature. However, the low temperature also increases the various cell resistances, particularly the cathode over-potential. Thus for any given current density the voltage loss as a result of internal cell resistance will be higher, resulting in a lower efficiency at higher currents. However, at these higher current densities the electronic leakage current is negligible, even at a higher temperature, but the cell resistance is lower. This leads to a lower voltage loss in the internal cell resistance, and thus a higher cell terminal voltage and hence efficiency.

A clear strategy for optimising the efficiency of a stack with these characteristics is therefore to allow the stack temperature to vary in the range 500-600° C., or possibly up to 650° C. depending upon the required power output. This is relatively simple to achieve since a higher electrical power output from the stack also results in a higher heat output, and by under-cooling the stack, the temperature can easily be allowed to rise with an increased power output, and vice-versa.

However, in the event of a rapid increase in power demand, the stack may not be at a high enough temperature to enable that demand to be met. Depending upon how rapidly the stack can be heated, it may be possible, if required, to cover this demand temporarily using some form of energy storage.

As an alternative or in addition to the method described above, a second method of increasing the stack efficiency is presented below.

Method 2

Figure 2:
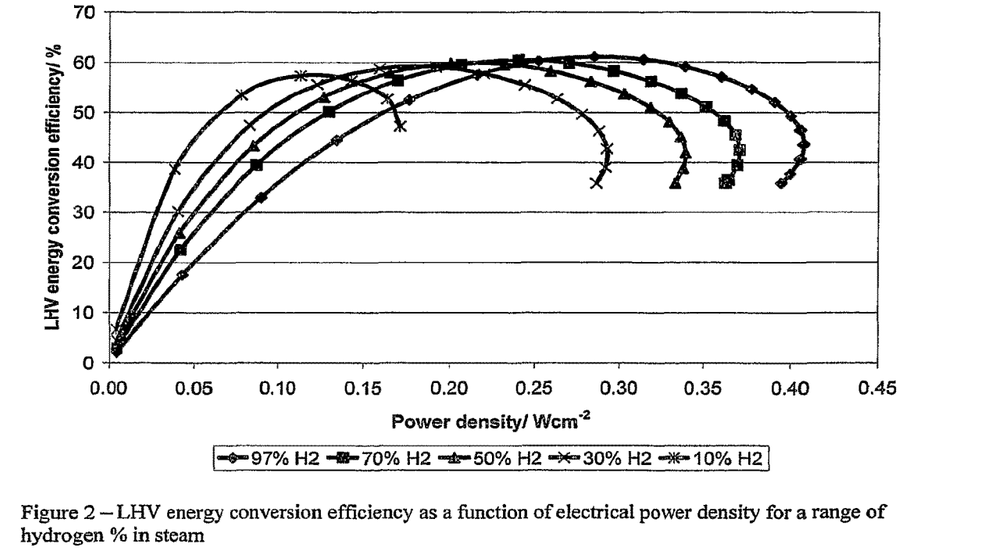
FIG. 2 shows the energy conversion efficiency of a fuel cell with a CGO-based electrolyte plotted against electrical power density at a range of fuel dilutions.

FIG. 2 illustrates the results of another computer simulation of a CGO-based cell, this time with a nominal maximum power density of 0.4 $Wcm^{-2}$. In this case the temperature was kept constant at 570° C., and the dilution of the hydrogen fuel with steam was varied.

It can be seen that diluting the fuel with increasing percentages of steam has much the same effect as reducing the temperature. This is largely because the addition of higher percentages of steam to the hydrogen fuel makes the fuel less reducing. This has the effect of lessening the tendency of $Ce^{4+}$ ions in the electrolyte to reduce to $Ce^{3+}$, and thus reduces the electronic conductivity of the electrolyte. However, diluting the fuel also increases the anode resistance and reduces the cell open-circuit voltage, thus reducing the maximum power output achievable.

Another possible strategy to optimise the stack efficiency at part-load is to dilute the fuel with an increasing percentage of steam as the load falls. This method is equally applicable if the fuel is diluted with carbon dioxide, nitrogen, or a mixture of steam, nitrogen and/or carbon dioxide, or if the fuel gas is carbon monoxide, or a mixture of hydrogen and carbon monoxide.

A method of achieving this fuel dilution would be to mix the incoming fuel gas with a variable proportion of recycled exhaust gas from the anode side of the stack.

However, any method of diluting the anode fuel gas, for example by supplying steam, nitrogen and/or carbon dioxide from a separate source would fall within the scope of the present invention.

Figure 3:
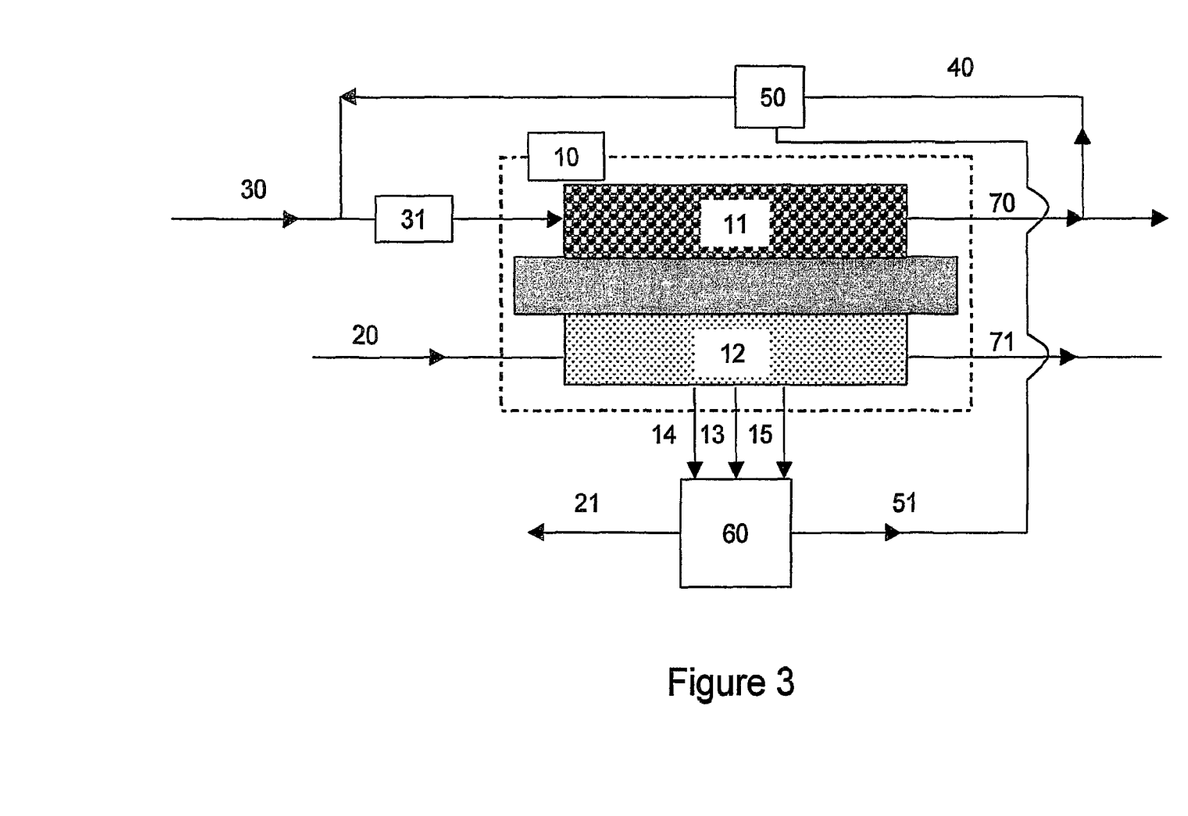
FIG. 3 schematically shows a fuel cell stack with a control system for controlling one or more operating conditions of the fuel cell stack dependent upon a required power output.

FIG. 3 schematically shows a solid oxide fuel cell stack with mixed ionic/electronic conducting electrolytes with a control system for controlling at least one of the temperatures of the fuel cell stack and/or the dilution of the fuel delivered to the stack.

Fuel cell stack 10 has an anode compartment 11 through which a hydrogen-containing fuel gas is passed, and a cathode compartment 12 through which air is passed. The fuel cell stack is made up of single or multiple arrangements of anode, electrolyte and cathode arranged in layers to achieve a functioning fuel cell stack. The stack has a fuel inlet 30, through which either hydrogen or a hydrocarbon fuel such as methane is passed, and an outlet conduit 70 through which anode compartment exhaust gases leave the stack. These exhaust gases are typically a mixture of steam and unreacted hydrogen. If the original fuel was a hydrocarbon, the exhaust gases will also contain carbon oxides. A recycle conduit 40 is provided which enables exhaust gases to be mixed with the incoming fuel, by means of a variable compressor 50. This compressor could either be an electrically driven blower or some form of ejector or jet pump.

Optionally, the mixture of incoming fuel and recycled exhaust gases may be fed to a reformer unit 31, which converts a hydrocarbon fuel to a mixture of hydrogen and carbon oxides by reaction with steam.

The stack is also provided with an air inlet conduit 20, by which preheated air is fed to the stack, both as an oxidant and coolant. The pre-heating can occur by means that include using excess heat from the fuel cell stack, or recovering heat from the stack exhaust conduits, or using a separate heat source such as induction heating, burning or recovering heat from another external process. The cathode compartment also has an outlet conduit 71 to allow the exhaust gases to be removed from the stack.

A microprocessor 60 is provided which may be part of a computer or printed circuit board for example. The microprocessor receives inputs from the stack temperature 13, the stack voltage 14 and the stack current 15. The microprocessor is arranged to control the stack temperature via control line 21, and the ratio of fresh fuel to recycled exhaust gas via control line 51, which controls the variable compressor 50. Alternatively the dilution of the incoming fuel may be controlled by the addition of a controlled amount of steam, carbon dioxide or an inert gas from another source.

The control of the stack temperature via line 21 may be effected by a number of methods, or combinations of methods, including but not limited to:

1) Varying the volume of air fed to the stack
2) Varying the temperature of the air fed to the stack
3) Varying the concentration of unreformed hydrocarbon fuel entering the stack, assuming internal reforming occurs
4) Varying the temperature of the fuel entering the stack The microprocessor receives an input of the power output of the stack by multiplying the stack voltage and current signals 14 and 15. The microprocessor will contain a look-up table or similar which will contain the optimum stack temperature and/or fuel dilution for a given power output. The microprocessor will manipulate control variables 21 and 51 to attempt to achieve this optimum for a given power output.

Figure 4:
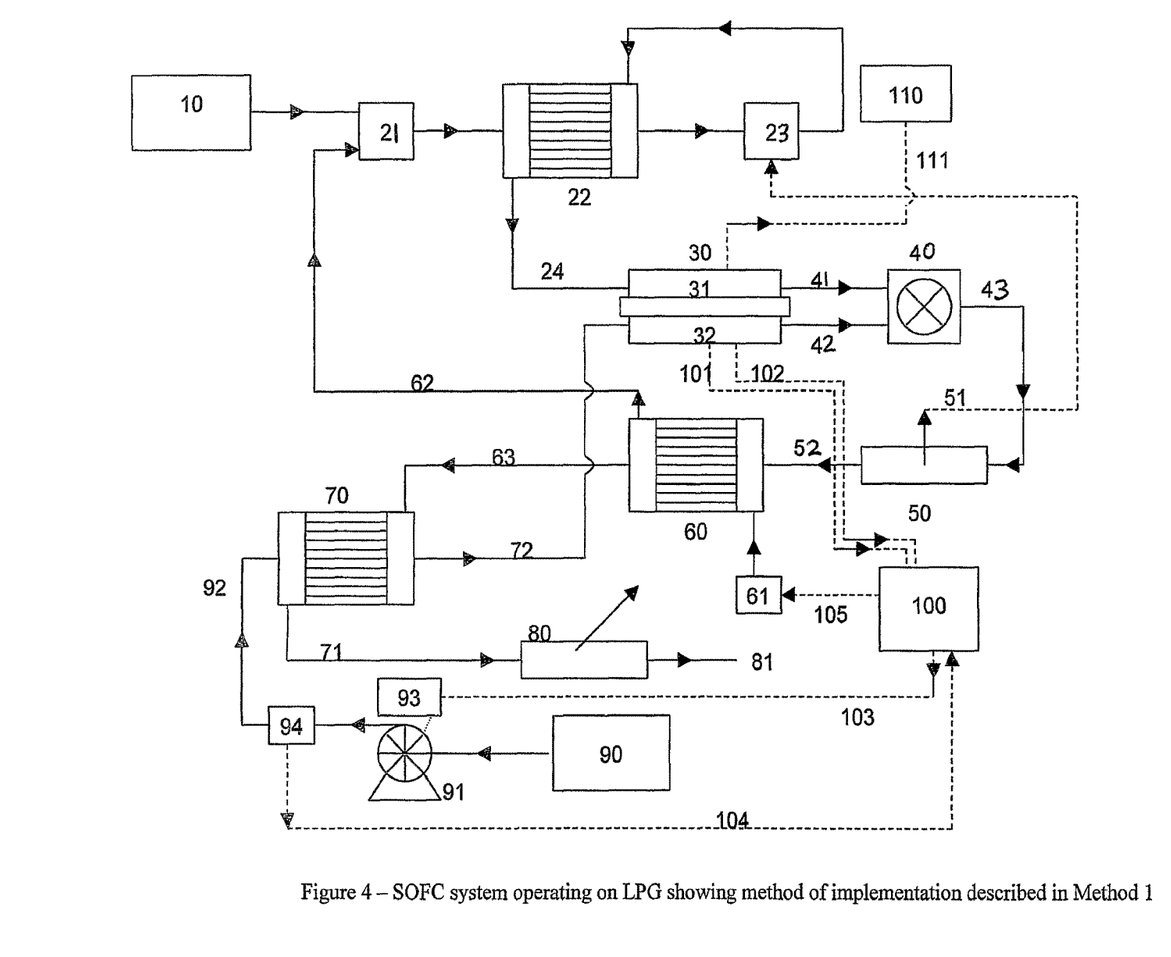
FIG. 4 schematically shows a Solid Oxide Fuel Cell system operating on LPG fuel.

FIG. 4 schematically illustrates a complete Solid Oxide Fuel Cell system operating on liquid petroleum gas (LPG) fuel. This system illustrates how a method of controlling an intermediate-temperature solid oxide fuel cell (IT-SOFC) stack described in method 1 could be implemented in practice. This system is illustrated as an example only, and many other configurations could be adopted which would achieve the same result.

LPG fuel is supplied through some form of mass flow control and desulphurising system 10. The fuel is mixed with steam from pipe 62 in mixer 21, at a ratio of at least two moles of steam for every mole of carbon in the fuel. The steam/LPG mixture is then preheated to around 430° C. in the fuel heat exchanger 22, and then fed to the reformer 23. In the reformer the mixture is heated to around 700° C. by means of heat exchange with the exhaust gas stream, which is illustrated schematically by connection 51 from heat exchanger 50. At this elevated temperature the hydrocarbons in the fuel (predominantly propane with a small fraction of butane, propylene and trace components such as pentane) react with the steam to form a hydrogen-rich reformate mixture. This reformate mixture would typically be 60-70% hydrogen by volume, with a lower percentage of steam, carbon monoxide, carbon dioxide and methane. This gas mixture is suitable for fuelling an SOFC stack without further treatment.

The reformate mixture is cooled to a temperature suitable for feeding to the stack by means of the fuel heat exchanger 22, heating the incoming reactants in the process. The reformate mixture is then fed to the anode compartment 31 of the fuel cell stack 30 by means of the fuel inlet conduit 24. The fuel gas is partially consumed within the stack, and exhaust gas leaves the anode compartment of the stack by means of the exhaust conduit 41. The exhaust gas leaves at close to the temperature of the hottest part of the stack, typically 550-620° C. depending on the operating condition. The exhaust gas is predominantly steam and carbon dioxide, with smaller amounts of unburned hydrogen and carbon monoxide.

Atmospheric air is drawn into the system through air filter 90, by air blower 91. The blower 91 has a variable speed motor controlled by motor controller 93, and by this means the mass-flow of air drawn into the system can be varied. The mass flow of air being drawn into the system is measured by mass flow sensor 94. The air is provided both as an oxidant and as a means of cooling the SOFC stack, as it is normal for considerably more air to be fed than that required as an oxidant, the remainder carrying excess heat out of the stack.

The air is fed from the mass flow sensor 94 to the air preheater 70, where it is preheated to a temperature suitable to be fed into the stack (typically 450-500° C.). The incoming air is preheated by cooling the hot exhaust gas stream 63. The preheated air is then fed to the cathode compartment 32 of the fuel cell stack 30 by means of air conduit 72. As with the fuel, the oxygen in the air is partially consumed by the fuel cell reaction. The residual air, somewhat depleted of oxygen, leaves the stack by means of air exhaust conduit 42. As with the fuel gas, the air will typically be at close to the maximum stack temperature, typically 550-620° C. depending on the operating condition.

Both the air and fuel exhaust conduits 41 and 42 feed into the system afterburner 40, in which the air and fuel exhaust streams are mixed together, and the unreacted hydrogen and carbon monoxide from the stack exhaust are burned conventionally to generate heat. The resulting hot (typically 700-900° C.) exhaust gas stream 43 is first fed through heat exchanger 50 to provide heat for the reformer 23. The cooler gas stream 52 from heat exchanger 50 is then fed to steam generator 60, in which it is used to evaporate water supplied by feed pump 61. The resulting steam is then fed to the reformer via pipe 62. The exhaust gas, now cooled to around 600° C., is then fed to the air preheater 70 to preheat the incoming air. Finally the exhaust gas, still at around 250° C., is fed to heat exchanger 80 which can be used to recover waste heat for a combined heat and power application.

The stack is provided with an external power demand 110, which draws current off the stack via cable 111. The nature of the power demand could be one of a range of different applications.

The system is provided with a microprocessor based control unit 100. This measures the stack current via input 101, and the stack temperature via input 102. It also measures the mass flow of air entering the system via the mass-flow sensor 94 and input 104. The control unit controls the air blower 91 by means of the motor controller 93 and output 103. In this way the controller can control the air flow to the stack. The control unit 100 also controls the water feed pump 61 by output 105. In this way the ratio of steam to fuel in the reformer can also be changed.

The performance of the system illustrated in FIG. 4 has been simulated on a computer. The system simulated is based on a stack with a power output of 1 kW$_e$, and a system supplying AC power. The AC power output of the system is always less than the stack power output because various parts of the system such as the air blower consume power.

In this simulation the system is operated for 10 minutes (600 seconds) at full AC power (800 W). The power is then ramped down to half AC power (400 W), and then the stack temperature is lowered by 25° C. by temporarily increasing the air flow to increase the rate of cooling within the stack. The clearly beneficial effect of lowering the stack temperature under part-load conditions can be seen.

Figure 5:
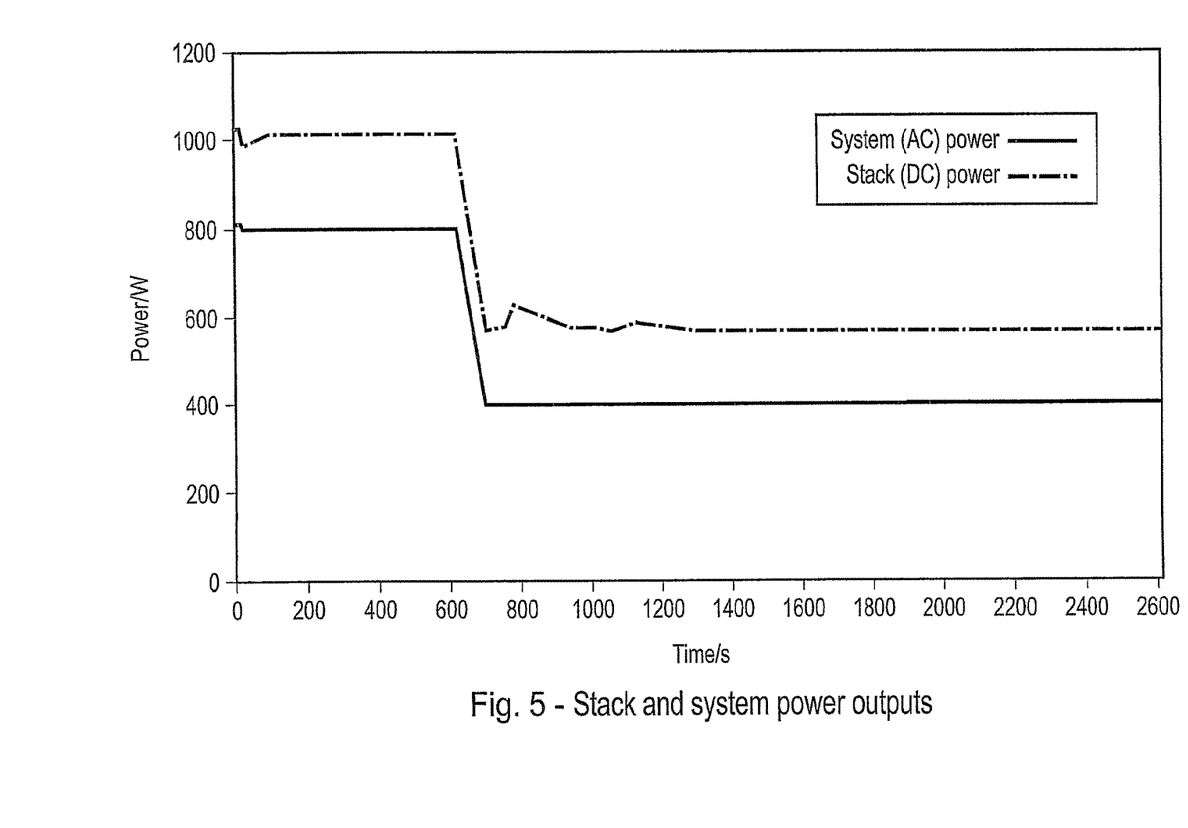
FIG. 5 shows the stack (DC) and system (AC) power outputs during simulations of the system shown in FIG. 4.
Figure 6:
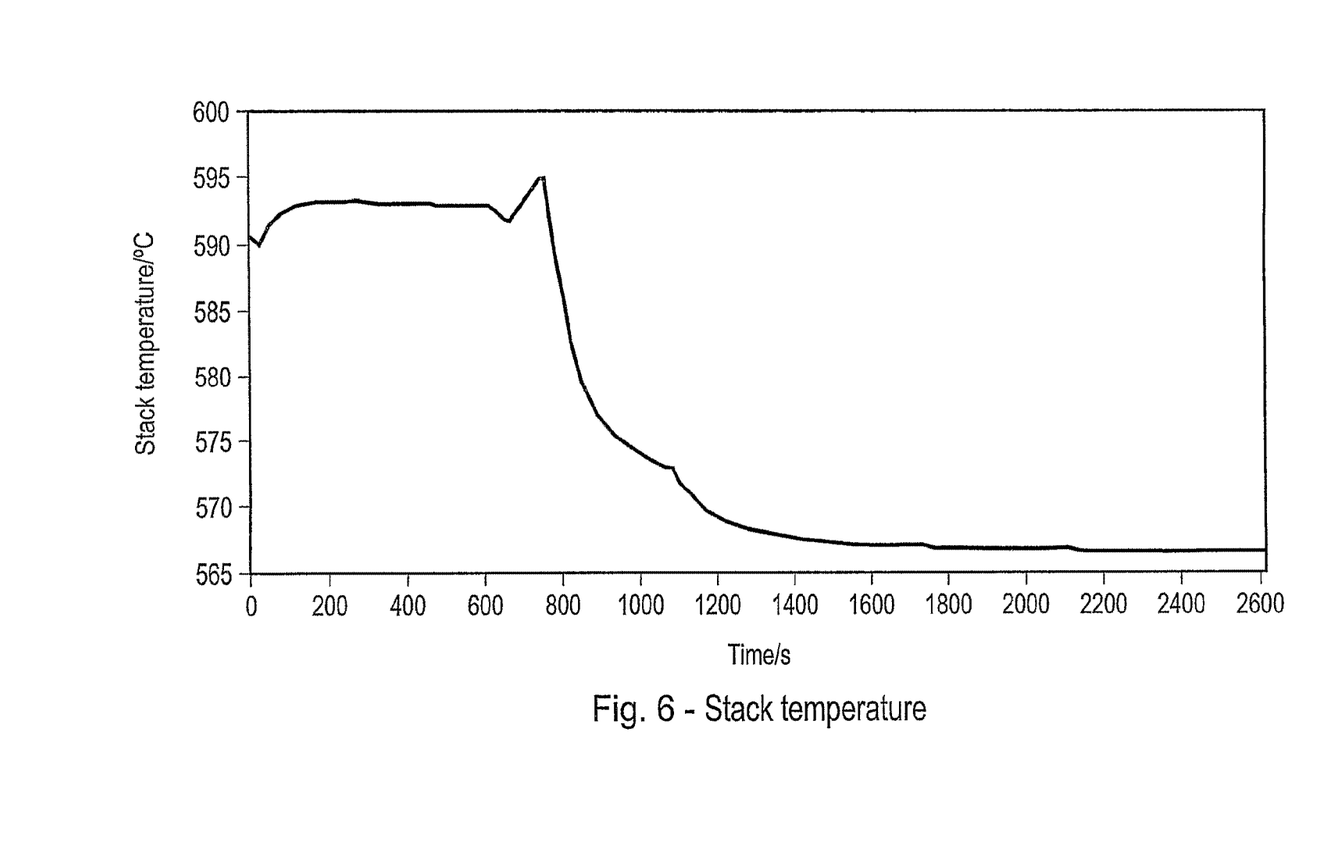
FIG. 6 shows the stack temperature during the simulations.
Figure 7:
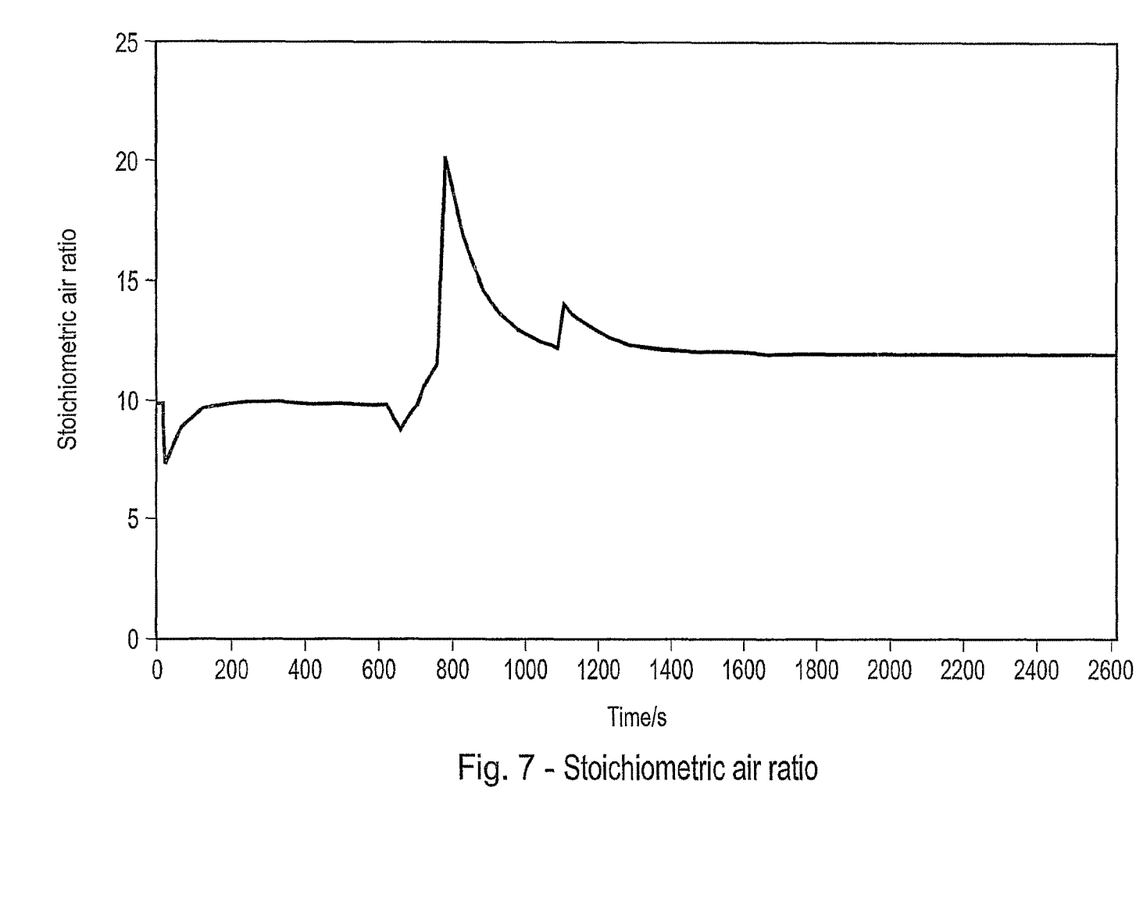
FIG. 7 shows the stoichiometric air ratio during the simulations.

FIG. 5 shows the stack (DC) and system (AC) power outputs during the simulations, illustrating the ramping down of power from 800 to 400 $W_e$. FIG. 6 shows the stack temperature during the simulation, and FIG. 7 the stoichiometric air ratio. This represents the ratio of the actual air-flow to the theoretical air demand to supply enough oxygen for the fuel cell reaction. It can be seen that at full power this ratio is around 10, representing the large amount of air required for stack cooling. The air ratio then increases to a maximum of around 20 as the air flow is increased to cool the stack down. The increase in air flow at around 1100 s is as a result of the stack temperature controller being reset to make it more sensitive as the stack temperature nears the new setpoint.

Figure 8:
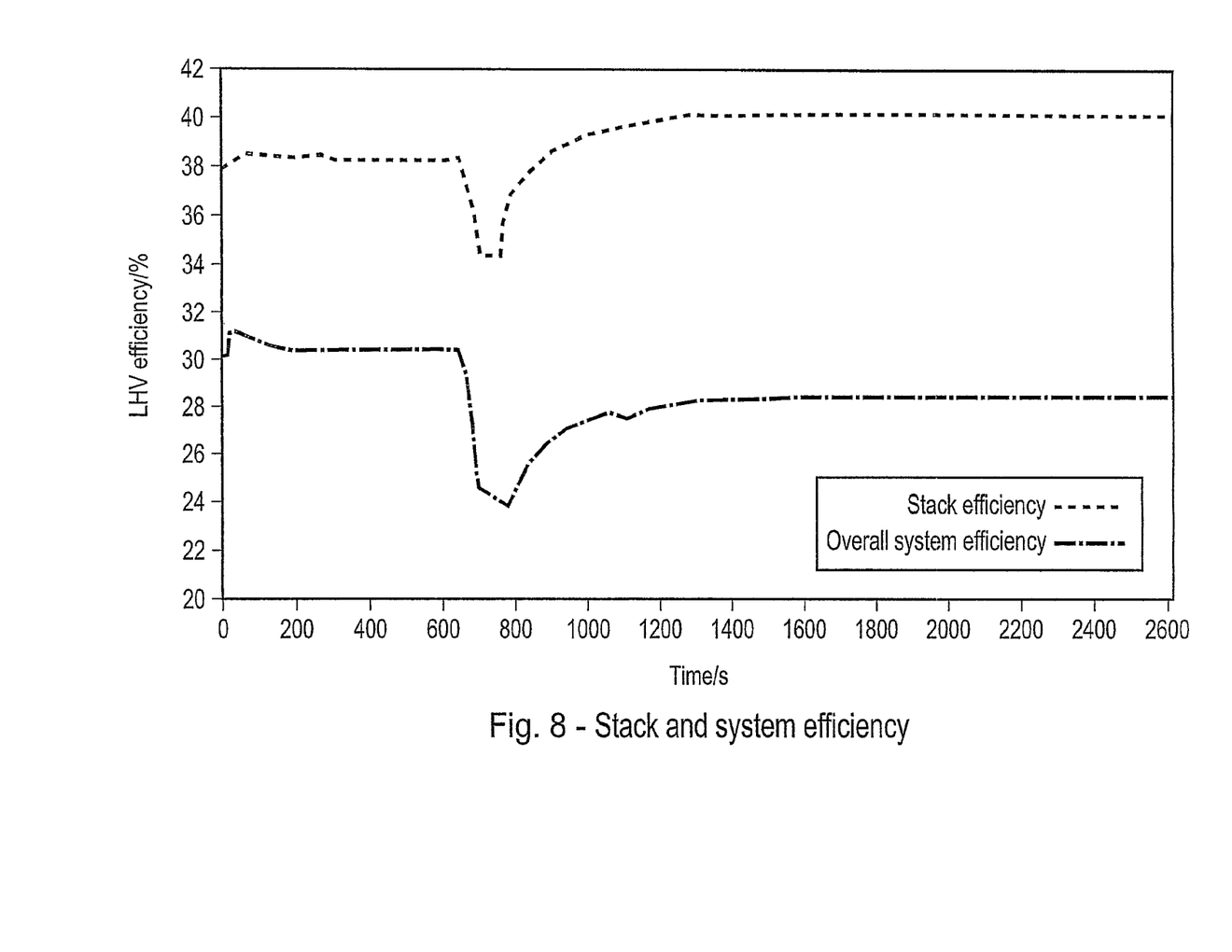
FIG. 8 shows the resulting stack and system efficiencies during the simulations.

FIG. 8 shows the resulting stack and system efficiencies. It can be seen that with the stack temperature maintained at around 590° C., there is a significant fall in efficiency as the load is reduced. This is as a result of increasing electronic conductivity in the electrolyte as the current-density is reduced. However, as the stack temperature falls the efficiency recovers until it is comparable with the full-load efficiency. In fact the stack efficiency is better than the full load efficiency as a result of the higher cell voltage. However the system efficiency is a little worse as a result of fixed parasitic power demands such as that required to run the control system.

Figure 9:
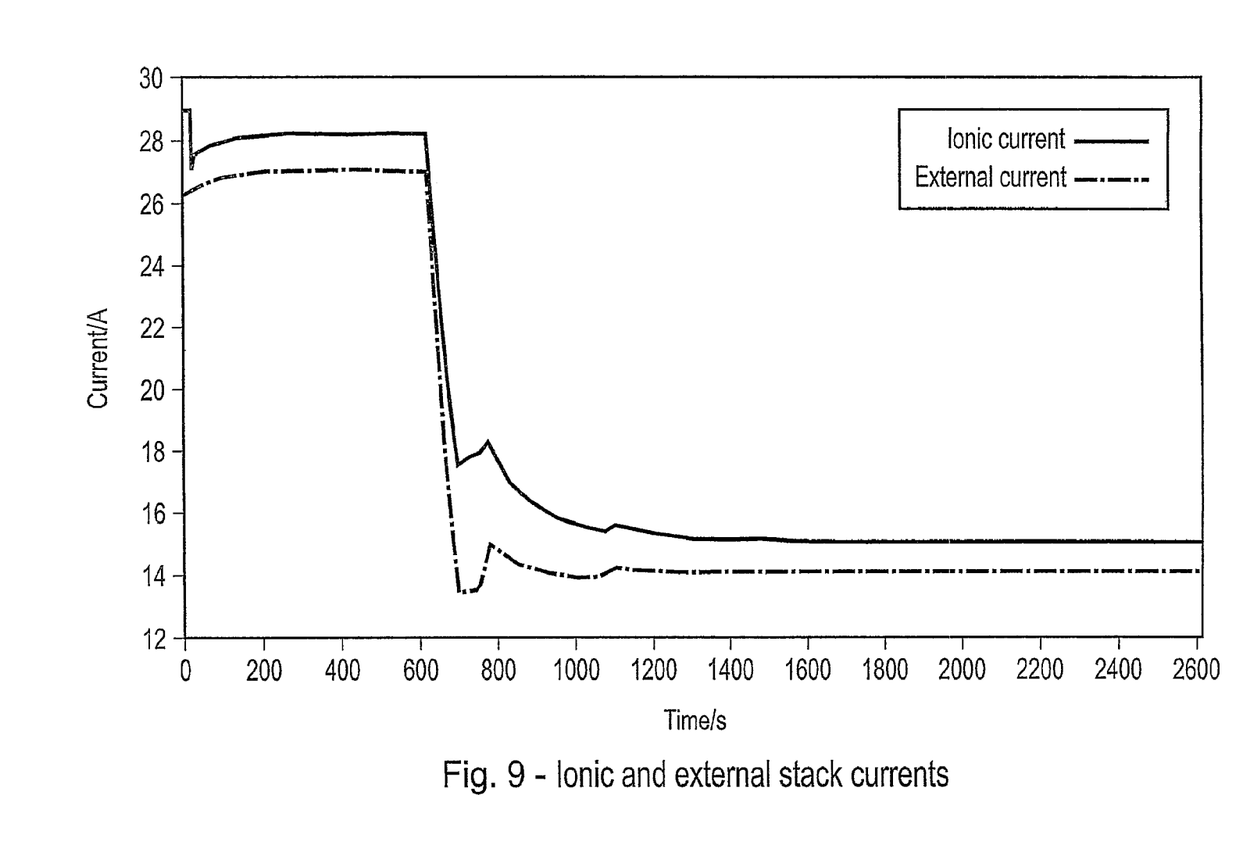
FIG. 9 shows the ionic and external currents within the stack during the simulations.

FIG. 9 shows the ionic and external currents within the stack. The external current is the current flowing in the external circuit, and the ionic current is the sum of the external current and the electronic leakage current. It can be seen that the gap between these two lines, representing the magnitude of the electronic leak, increases as the external current falls. However, it can also be seen that the gap closes as the stack temperature falls under part-load conditions.

Figure 10:
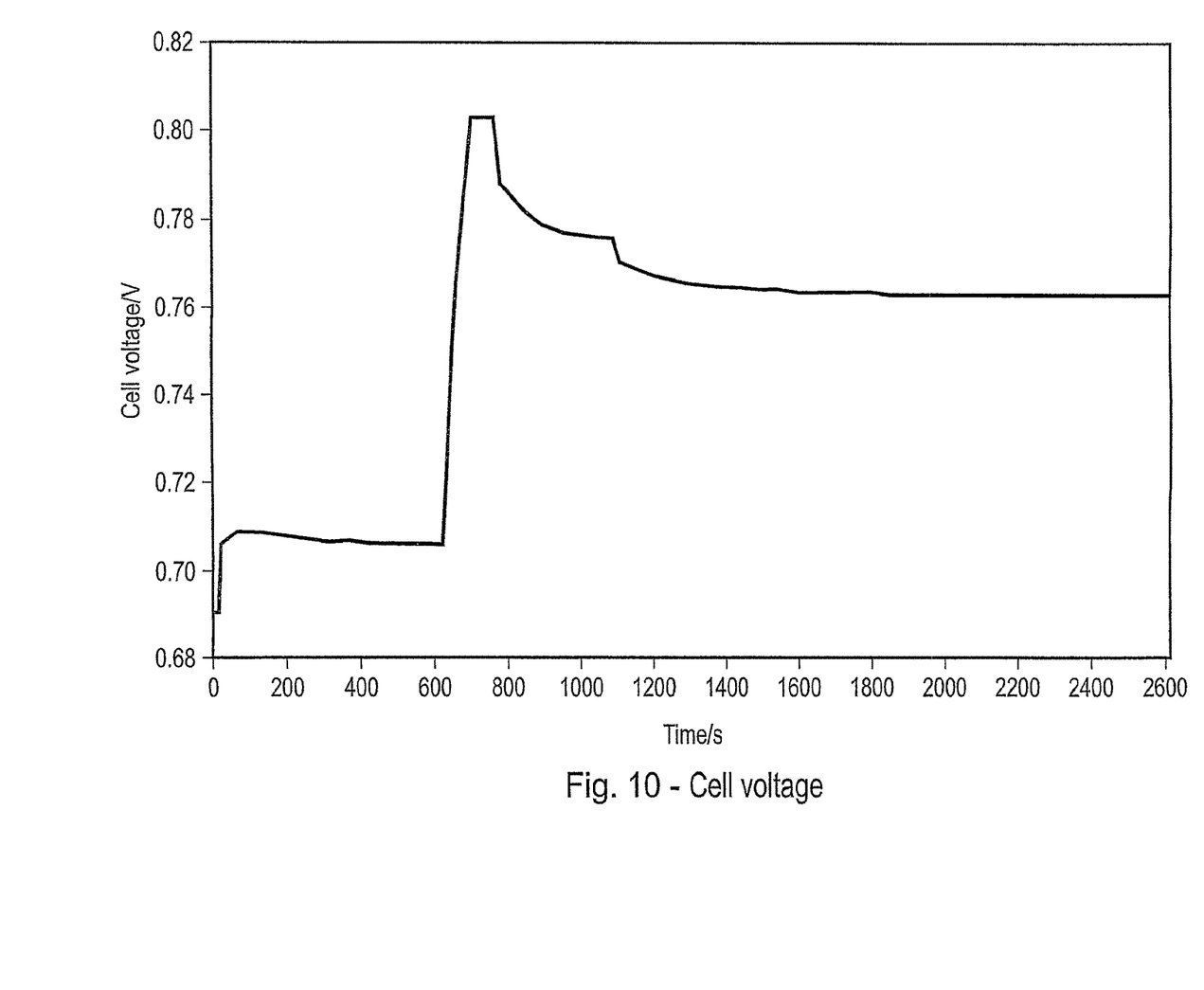
FIG. 10 shows the predicted voltage of a single fuel cell.

Finally FIG. 10 shows the predicted voltage of a single fuel cell. It can be seen that the cell voltage increases as the load is reduced, as would be expected. It can also be seen that the cell voltage actually falls a little as the stack cools, which would normally represent a loss of efficiency as the cell resistance increases. However, the benefit of reducing the leakage current outweighs the increase in resistance provided the temperature fall is not too large.

Figure 11:
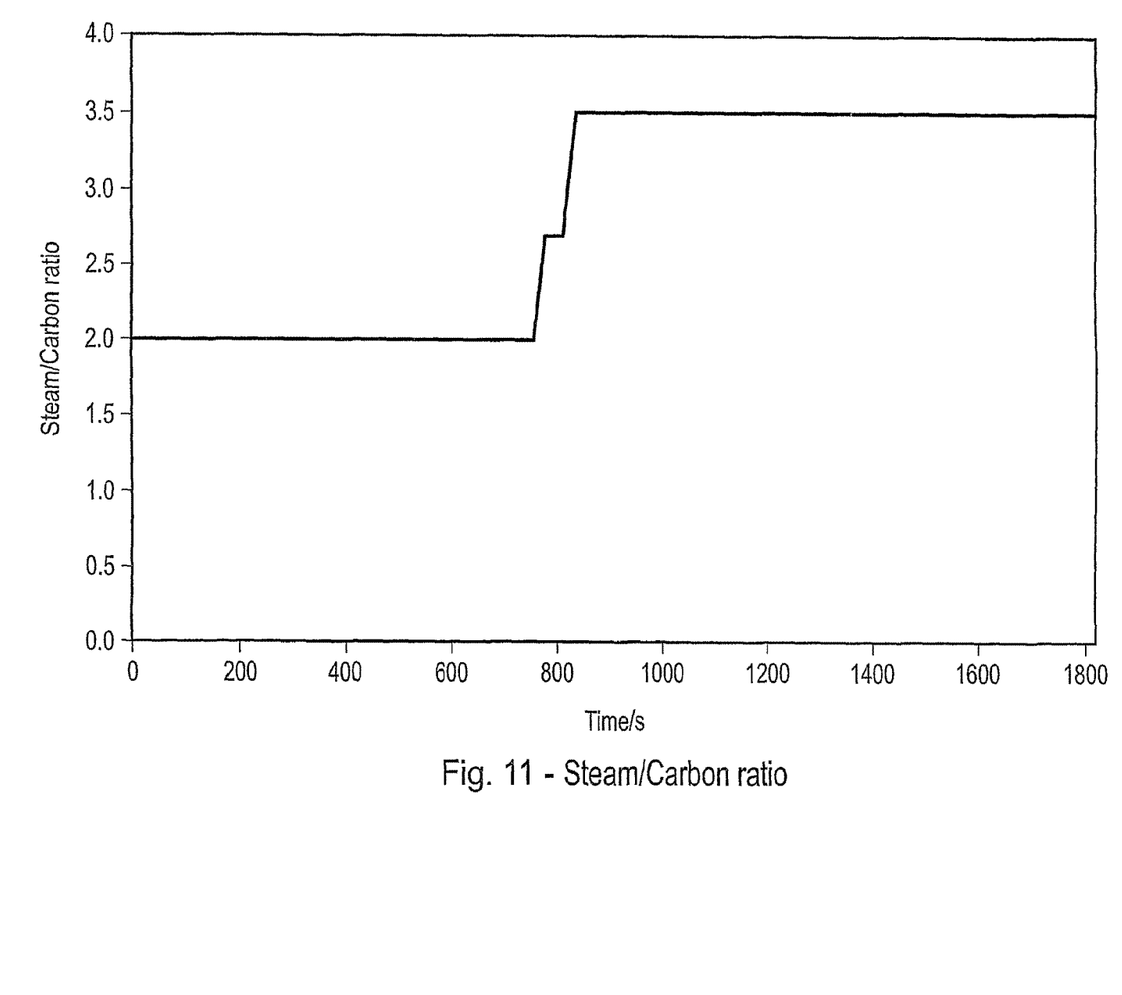
FIG. 11 shows the steam/carbon ration in the reformer for a further simulation and FIG. 12 shows the stack efficiency for the further simulation.
Figure 12:
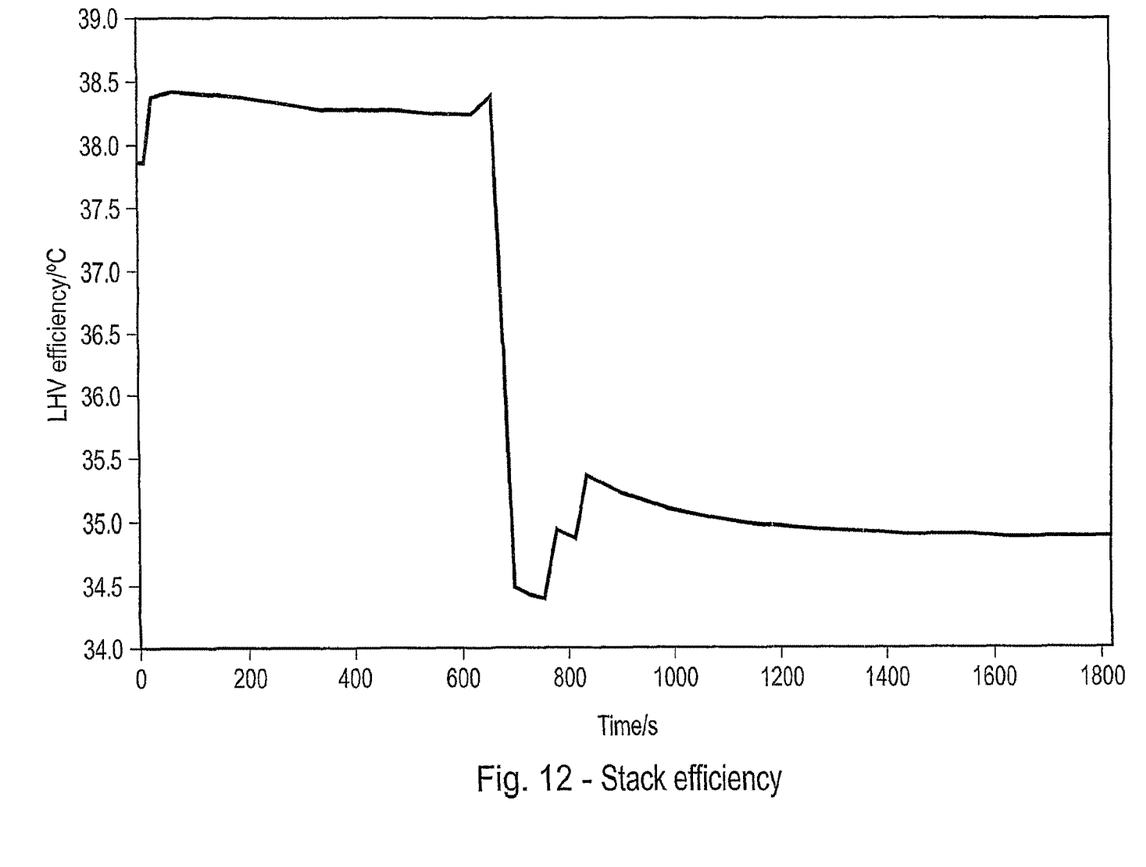

A second simulation was performed to demonstrate the effect of diluting the fuel on the system efficiency at part load (method 2). A similar simulation was performed where the stack was run at full power for 10 minutes, and then dropped to half power. However this time the stack was maintained at a constant temperature but the mass flow of water to the steam generator from pump 61 was increased in two stages. This has the effect of increasing the steam/carbon ratio in the reformer from 2.0 to 3.5, and thus increasing the dilution of the fuel in the stack, as is illustrated in FIG. 11. The effect on the stack efficiency can be seen in FIG. 12. The benefit of this approach is less marked than changing the stack temperature (method 1), but a small improvement in efficiency is clearly apparent.

Many variations may be made to the examples described above whilst still falling within the scope of this invention. For example the microprocessor may just control the stack temperature but not the fuel dilution, or vice-versa.

The invention claimed is:

1. A method of supplying variable electrical power to meet a variable electrical power demand, comprising:
   providing a variable power output solid oxide fuel cell stack including at least one solid oxide fuel cell having a mixed ionic/electronic conducting electrolyte, the material of the electrolyte comprising at least a doped ceria oxide;
   maintaining an operating temperature of the fuel cell stack in a temperature range of 500° C. to 600° C.;
   determining a present electrical power output of the solid oxide fuel cell stack;
   determining a required electrical power output of the solid oxide fuel cell stack to meet the electrical power demand;
   comparing the determined present electrical power output and the required electrical power output of the solid oxide fuel cell stack in order to determine a change in the present electrical power output of the solid oxide fuel cell stack needed to meet the required electrical power demand; and
   effecting the needed change in the present electrical power output of the solid oxide fuel cell by controlling the stack temperature in said range of 500° C. to 600° C. so as vary electrolyte conductivity and thereby alter the efficiency of the fuel cell stack, a needed increase in electrical power requiring an increase in the temperature, and a needed decrease in electrical power requiring a decrease in the temperature.

2. A method according to claim 1, said at least one solid oxide fuel cell electrolyte including gadolinium-doped cerium oxide.

* * * * *